United States Patent
Kim et al.

(10) Patent No.: US 8,208,474 B2
(45) Date of Patent: Jun. 26, 2012

(54) METHOD AND APPARATUS FOR TRANSMITTING/RECEIVING PACKET IN A MOBILE COMMUNICATION SYSTEM

(75) Inventors: Seong-Hun Kim, Suwon-si (KR); Sung-Ho Choi, Suwon-si (KR); Kyeong-In Jeong, Hwseong-si (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 340 days.

(21) Appl. No.: 11/829,552

(22) Filed: Jul. 27, 2007

(65) Prior Publication Data
US 2008/0049754 A1 Feb. 28, 2008

(30) Foreign Application Priority Data

Jul. 31, 2006 (KR) ........................ 10-2006-0072284
Jun. 15, 2007 (KR) ........................ 10-2007-0058867

(51) Int. Cl.
*H04Q 7/20* (2006.01)
(52) U.S. Cl. ........................................................ 370/394
(58) Field of Classification Search .................. 370/394, 370/389, 392
See application file for complete search history.

(56) References Cited

U.S. PATENT DOCUMENTS

| | | | | |
|---|---|---|---|---|
| 6,418,143 | B1* | 7/2002 | Rezaiifar et al. | 370/394 |
| 6,507,582 | B1* | 1/2003 | Abrol | 370/394 |
| 6,606,301 | B1* | 8/2003 | Muller et al. | 370/230 |
| 6,873,615 | B2* | 3/2005 | Ratzel | 370/349 |
| 7,499,674 | B2* | 3/2009 | Salokannel et al. | 455/69 |
| 2002/0075867 | A1 | 6/2002 | Herrmann | |
| 2002/0141414 | A1 | 10/2002 | Rezaiifar et al. | |
| 2003/0198250 | A1 | 10/2003 | Hakenberg et al. | |
| 2007/0041382 | A1* | 2/2007 | Vayanos et al. | 370/394 |

FOREIGN PATENT DOCUMENTS

| | | |
|---|---|---|
| EP | 0 186 343 | 12/1985 |
| JP | 06-318930 | 11/1994 |
| KR | 1020020028846 | 4/2002 |
| WO | WO 98/58469 | 12/1998 |
| WO | WO 2006/116620 | 11/2006 |

* cited by examiner

*Primary Examiner* — Chirag Shah
*Assistant Examiner* — Jay P Patel
(74) *Attorney, Agent, or Firm* — The Farrell Law Firm, P.C.

(57) ABSTRACT

A method and apparatus for transmitting a packet in a mobile communication system. A transmitting side allocates a short sequence number for an initial transmission packet using some bits among bits of a predetermined length for expressing a sequence number of the packet, and sets a first flag indicating use of the short sequence number. The transmitting side inserts the short sequence number and the first flag into the packet, and transmits the packet to a receiving side.

13 Claims, 12 Drawing Sheets

METHOD AND APPARATUS FOR TRANSMITTING/RECEIVING PACKET IN A MOBILE COMMUNICATION SYSTEM

PRIORITY

This application claims priority under 35 U.S.C. §119(a) to a Korean Patent Application filed in the Korean Intellectual Property Office on Jul. 31, 2006 and assigned Serial No. 2006-72284, and a Korean Patent Application filed in the Korean Intellectual Property Office on Jun. 15, 2007 and assigned Serial No. 2007-58867, the disclosure of which is incorporated herein by reference.

BACKGROUND OF THE INVENTION

1. Field of the Invention

The present invention relates generally to a mobile communication system to which Automatic Repeat reQuest (ARQ) is applied, and in particular, to a method and apparatus for efficiently using a sequence number used for ARQ in packet transmission/reception.

2. Description of the Related Art

A Universal Mobile Telecommunication Service (UMTS) system is a $3^{rd}$ generation asynchronous mobile communication system that employs Wideband Code Division Multiple Access (WCDMA) and is based on Global System for Mobile Communications (GSM) and General Packet Radio Services (GPRS), which are European mobile communication systems.

In 3rd Generation Partnership Project (3GPP) in charge of UMTS standardization, Long Term Evolution (LTE), the next generation mobile communication system of the UMTS system, is now under discussion. LTE is a technology for implementing high-speed packet-based communication at a data rate of a maximum of 100 Mbps, aiming at deployment in around 2010. To this end, several plans are under discussion, including one plan to reduce the number of nodes located in a transmission path by simplifying a configuration of the network, and another plan to approach radio protocols as close to radio channels as possible.

FIG. 1 is a diagram illustrating an exemplary configuration of an Evolved UMTS mobile communication system to which the present invention is applicable.

Referring to FIG. 1, Evolved UMTS Radio Access Networks (E-RANs) 110 and 112 each are simplified to a 2-node configuration of Evolved Node Bs (ENBs or Node Bs) 120, 122, 124, 126 and 128, and anchor nodes 130 and 132. A User Equipment (UE) 101 accesses an Internet Protocol (IP) network 114 by means of the E-RANs 110 and 112.

The ENBs 120 to 128 each correspond to the existing Node B of the UMTS system, and are connected to the UE 101 over a wireless channel. Compared to the existing Node B, the ENBs 120 to 128 perform complex functions. In LTE, all user traffic, including a real-time service such as Voice over IP (VoIP), is serviced over a shared channel, so there is a need for an apparatus for collecting status information of UEs and performing scheduling depending thereon. The scheduling is managed by the ENBs 120 to 128.

In order to implement a data rate of a maximum of 100 Mbps, the LTE system can use Orthogonal Frequency Division Multiplexing (OFDM) as a radio access technology in the 20-MHz bandwidth. In addition, an Adaptive Modulation & Coding (AMC) scheme for determining a modulation scheme and a channel coding rate according to a channel status of the UE can be applied to LTE.

Like the mobile communication system supporting High-Speed Downlink Packet Access (HSDPA) or Enhanced uplink Dedicated CHannel (E-DCH) service, the LTE system also performs Hybrid ARQ (HARQ) between the ENBs 120 to 128 and the UE 101. However, because it is not possible to satisfy various Quality-of-Service (QoS) requirements only with HARQ, outer ARQ can be performed in an upper layer, and the outer ARQ can also be performed between the UE 101 and the ENBs 120 to 128.

As described above, many next generation mobile communication systems including the LTE system can use both HARQ and ARQ as an error correction technique.

HARQ refers to a technique of soft-combining previously received data with retransmitted data without discarding the previously received data, thereby increasing a reception success rate. More specifically, an HARQ receiving side determines whether there is any error in a received packet, and then sends an HARQ positive ACKnowledgement (HARQ ACK) signal or an HARQ Negative ACKnowledgement (HARQ NACK) signal to a transmitting side according to presence/absence of the error. The transmitting side performs retransmission of the HARQ packet or transmission of a new HARQ packet according to the HARQ ACK/NACK signal. The HARQ receiving side soft-combines the retransmitted packet with the previously received packet, thereby reducing an error occurrence rate.

However, ARQ refers to a technique of checking a sequence number of a received packet, and requesting retransmission for the missing packet (or reception-failed packet), and this technique does not soft-combine the previously received packet with the retransmitted packets.

Particularly, in the LTE system, the ARQ operation is managed by a Radio Link Control (RLC) protocol layer, and the HARQ operation is managed by a Medium Access Control (MAC) or physical layer.

FIG. 2 is a diagram illustrating a protocol structure for an LTE system to which the present invention is applicable.

Referring to FIG. 2, the protocol structure can be established as a transmitting protocol structure (i.e., a protocol structure for a transmitting side) for a downlink service or a receiving protocol structure (i.e., a protocol structure for a receiving side) for an uplink service. In the following description, therefore, the protocol structures for the transmitting side and the receiving side will not be limited to any one of a UE (or terminal) and a Node B (or base station). In addition, both 'entity' and 'layer' are used as the terms indicating the same structure. Particularly, the term 'entity' stresses that a corresponding layer can be composed of a plurality of blocks, and the blocks operate independently of each other. However, the term 'layer', though it is identical to the term 'entity' in meaning, stresses the function of the corresponding layer rather than the independent operations of the blocks. Therefore, the 'entity' and the 'layer' are defined as the same terms, and used without distinction. In the LTE system, one Packet Data Convergence Protocol (PDCP) entity 205, 210, 215, 280, 285 and 290, and one Radio Link Control (RLC) entity 220, 225, 230, 265, 270 and 275 are configured per service.

The PDCP entities 205, 210, 215, 280, 285 and 290 take charge of an IP header compression/decompression operation, and the RLC entities 220, 225, 230, 265, 270 and 275 configure a PDCP Packet Data Unit (PDU) in an appropriate size, and perform an ARQ operation thereon. The PDU herein indicates a packet output from a particular protocol entity, and the PDCP PDU refers to a packet output from the PDCP entity.

MAC layers 235 and 260 are connected to several RLC entities 220, 225, 230, 265, 270 and 275 formed in one UE, and perform an operation of multiplexing multiple RLC PDUs output from the RLC entities 220, 225, 230, 265, 270 and 275 into a MAC PDU, or demultiplexing RLC PDUs from the MAC PDU.

HARQ layers 240 and 250 transmit/receive the MAC PDU through a predetermined HARQ operation. Physical layers 245 and 250 perform an operation of channel-coding/modulating upper layer data into an OFDM symbol and transmitting the OFDM symbol over a wireless channel, or demodulating/channel-decoding an OFDM symbol received over a wireless channel and delivering the channel-decoded OFDM symbol to an upper layer.

FIG. 3 is a diagram illustrating an RLC PDU used in an RLC layer.

Referring to FIG. 3, a basic unit of ARQ, used in an RLC layer, is called an RLC PDU 305.

The RLC layer makes a payload 320 by slicing or concatenating data such as PDCP PDU, provided from an upper layer, in an appropriate size, and makes the RLC PDU 305 by inserting a Sequence Number (SN) 310 and other necessary header 315 into the payload 320.

The RLC PDU 305 is transmitted to a receiving RLC entity (i.e., an RLC entity of a receiving side) through a MAC layer and a physical layer. The receiving RLC entity determines a success/failure in packet reception using the sequence number 310 of the RLC PDU 305, and then sends a report to a transmitting RLC entity (i.e., an RLC entity of a transmitting side), and the transmitting RLC entity retransmits an RLC PDU corresponding to a missing sequence number reported by the receiving RLC entity.

Therefore, the sequence number 310 used for the RLC PDU 305 should be unambiguously distinguished from sequence numbers of other RLC PDUs.

FIG. 4 is a diagram for a description of a wraparound phenomenon based on a method of allocating a sequence number.

Referring to FIG. 4, an RLC layer sets a sequence number of an RLC PDU using finite or predetermined bits. That is, the number of bits used for the sequence number of the RLC PDU is finite, and if the sequence number monotonously increases one by one and reaches a predetermined value, it returns back to '0' (or makes a wraparound).

For example, if a sequence number has a k-bit size, the sequence number monotonously increases one by one from 0 (indicated by reference numeral 410) to ($2^k-1$) (indicated by reference numeral 415). Thereafter, the sequence number returns to '0' indicated by reference numeral 420, and monotonously increases again one by one.

Because the sequence number is repeatedly used as described above, the size of the sequence number should be large enough to avoid confusion due to the repeated use of the sequence number and to unambiguously distinguish an arbitrary RLC PDU.

Therefore, particularly in the next generation mobile communication system using ARQ, the sequence number should be large enough in size for the following reason. That is, if an arbitrary value is used as a sequence number of the RLC PDU at an arbitrary time, it is not possible to any longer retransmit an RLC PDU with a sequence number having the same value as that used in the previous period.

Generally, UMTS uses a 12-bit sequence number, and the conventional retransmission protocol such as Transmission Control Protocol (TCP) uses a 16-bit sequence number.

Although a size of the sequence number to be used in the LTE system has not been determined yet, there is a high possibility that a size similar to the size of the sequence number used in the foregoing conventional system will be used.

However, the sequence number with the 12 to 16-bit size may have no problem in a good channel condition, but may cause excessively high overhead in a poor channel condition. According to the current discussion on LTE, a packet with the smallest size, transmitted for one transmission period, is expected to have about 100 bits, and in this case, the overhead caused by the 12 to 16-bit sequence number exceeds 10%. Therefore, there is a need for a method for efficiently using a sequence number of a desired transmission packet in the next generation mobile communication system such as the LTE system.

SUMMARY OF THE INVENTION

An aspect of the present invention is to address at least the problems and/or disadvantages and to provide at least the advantages described below. Accordingly, an aspect of the present invention is to provide a method and apparatus of using a variable-length indicator for a sequence number of a packet in a mobile communication system.

Another aspect of the present invention is to provide a method and apparatus of adjusting a length indicator to express a sequence number according to retransmission/non-retransmission in a mobile communication system.

According to one aspect of the present invention, there is provided a method for transmitting a packet in a mobile communication system. The packet transmission method includes allocating, by a transmitting side, a short sequence number for an initial transmission packet using some bits among bits of a predetermined length for expressing a sequence number of the packet, and setting a first flag indicating use of the short sequence number; and inserting the short sequence number and the first flag into the packet, and transmitting the packet to a receiving side.

According to another aspect of the present invention, there is provided a method for receiving a packet in a mobile communication system. The packet reception method includes receiving, by a receiving side, a packet transmitted from a transmitting side; detecting a short sequence number using flag information of the received packet, and restoring a full sequence number using the short sequence number; and reordering received packets according to the restored full sequence number, and delivering the reordered packets to an upper layer.

According to another aspect of the present invention, there is provided a packet transmission apparatus for allocating a sequence number to a packet and transmitting the packet in a mobile communication system. The packet transmission apparatus includes a controller for controlling a retransmission buffer and a transmission buffer to separately outputting a retransmission packet and an initial transmission packet; and a sequence number setter for, under control of the controller, allocating a full sequence number for a packet output from the retransmission buffer or allocating a short sequence number for a packet output from the transmission buffer using some lower bits among bits of a predetermined length for expressing the full sequence number, inserting the allocated full sequence number or short sequence number into the packet, and transmitting the packet.

According to further another aspect of the present invention, there is provided a packet reception apparatus for receiving a packet in a mobile communication system. The packet reception apparatus includes a sequence number length indicator checker for checking a header of a received packet, and determining whether a sequence number allocated to the packet is a short sequence number or a full sequence number; a sequence number restorer for, if the sequence number is a short sequence number, restoring a full sequence number of a predetermined length by including the short sequence number in some lower bits using the short sequence number; and a reception buffer for reordering received packets according to the full sequence number, and delivering the reordered packets to an upper layer.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Although the present invention will be described herein with reference to the LTE system, by way of example, the present invention can be applied to all communication systems employing ARQ without separate modification. In addition, the present invention can be applied to a mobile communication system employing Node B scheduling without separate modification.

The present invention provides a method and apparatus of appropriately adjusting a size of a sequence number according to circumstances. More specifically, according to the present invention, a transmitting side transmits only a part of a sequence number at an initial transmission, and a receiving side restores the original sequence number. At a retransmission, however, the transmitting side transmits the full sequence number.

The term 'RLC PDU' as used herein refers to a packet that is a unit of an ARQ operation in the mobile communication system.

Figure 1:
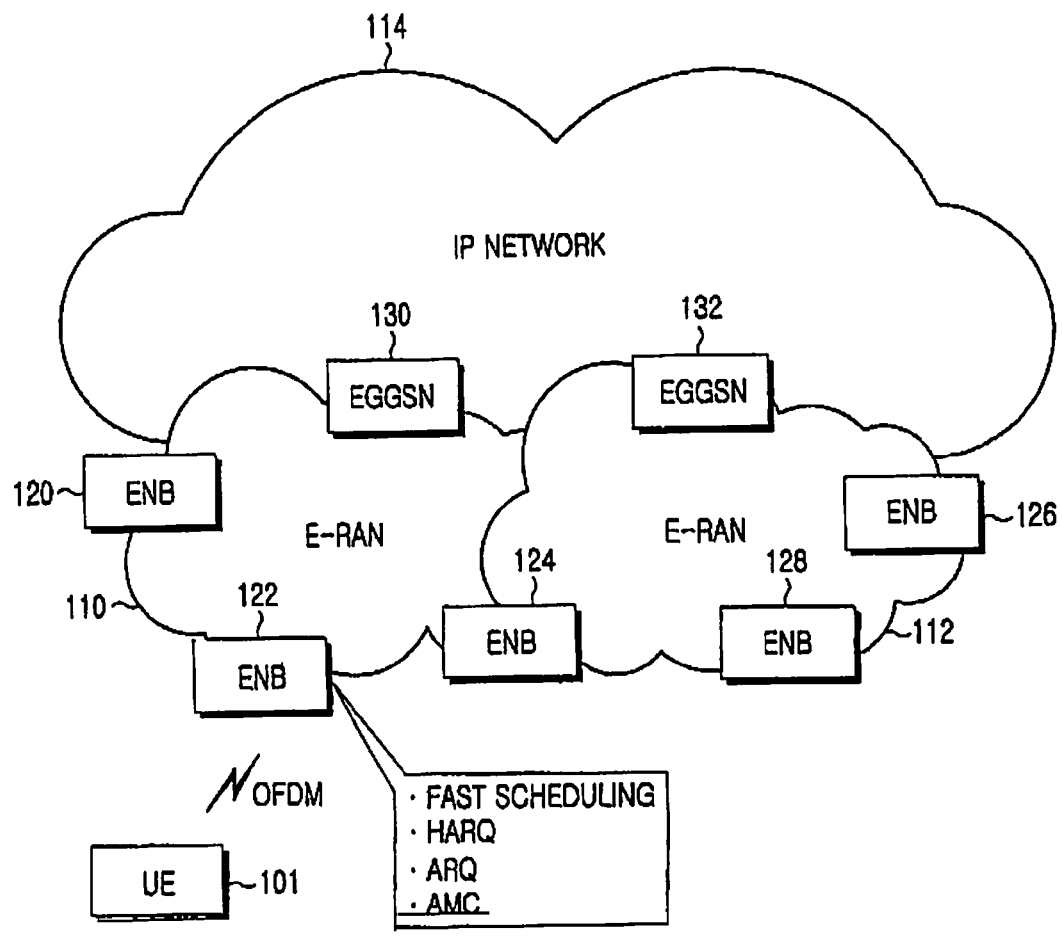
FIG. 1 is a diagram illustrating an exemplary configuration of the next generation mobile communication system to which the present invention is applicable.
Figure 2:
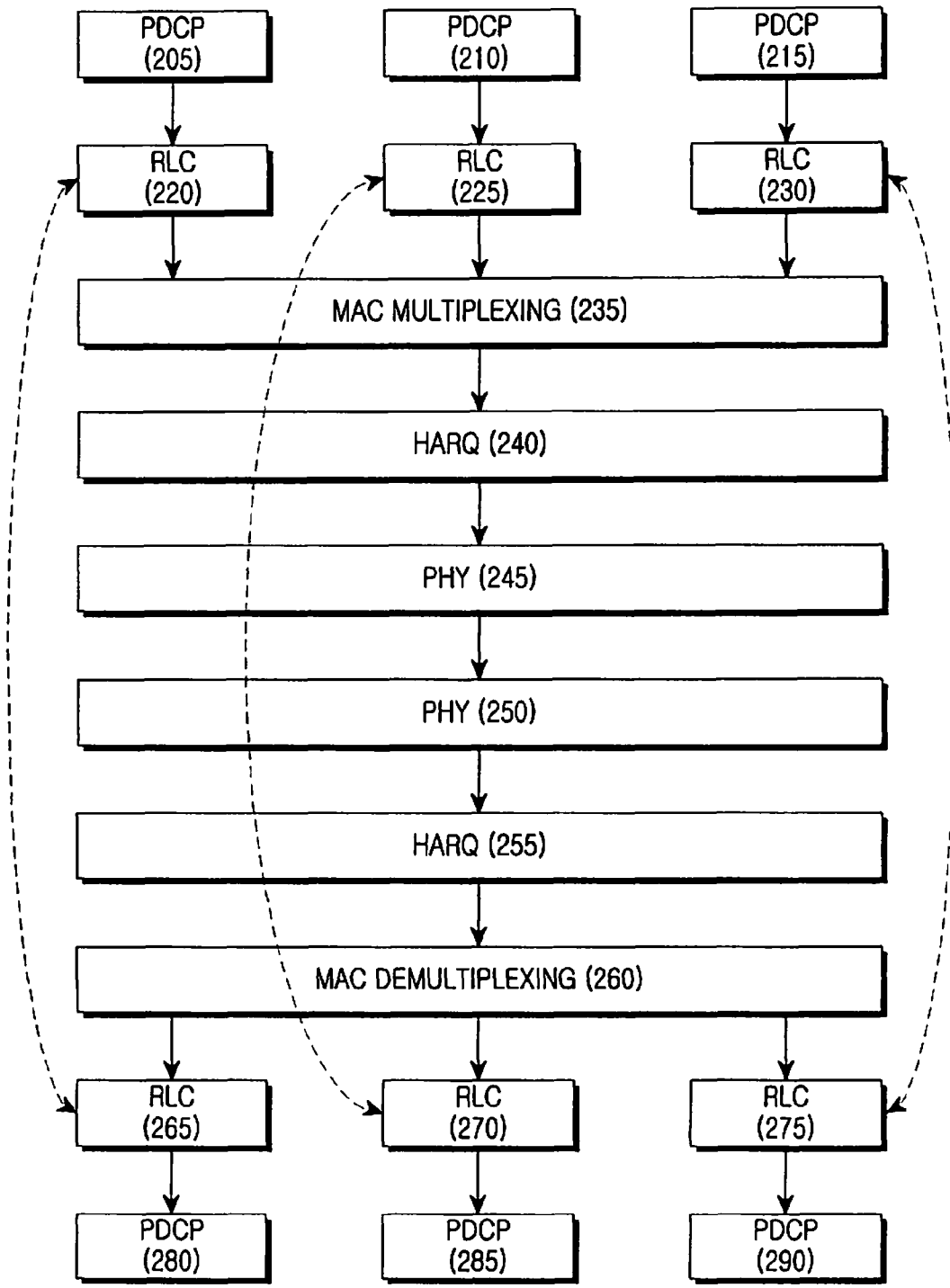
FIG. 2 is a diagram illustrating a protocol structure for the next generation mobile communication system to which the present invention is applicable.
Figure 3:
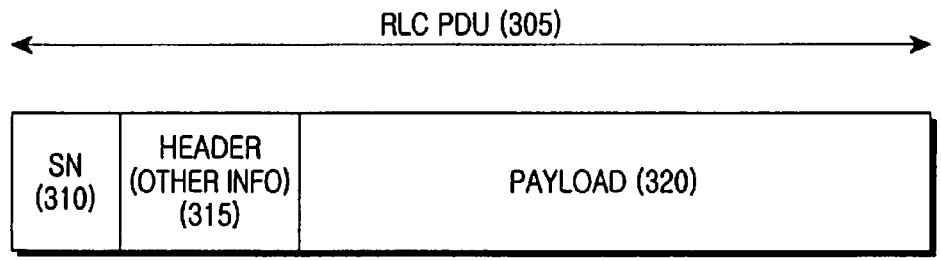
FIG. 3 is a diagram illustrating an RLC PDU format for the next generation mobile communication system to which the present invention is applicable.
Figure 4:
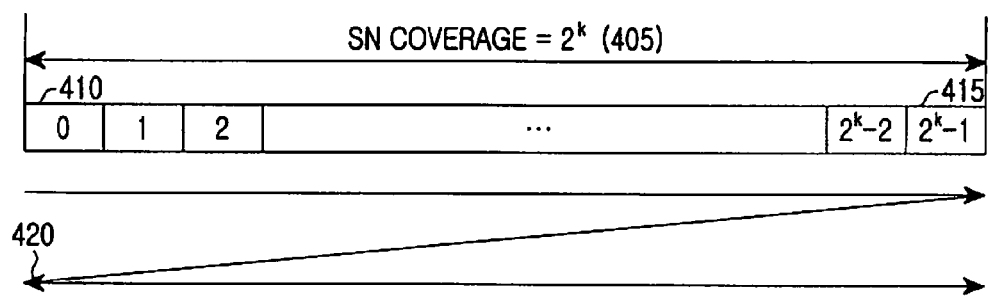
FIG. 4 is a diagram illustrating a method of allocating a sequence number.
Figure 5:
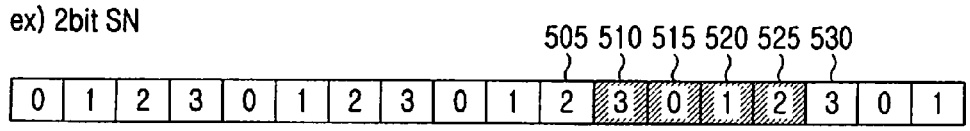
FIG. 5 is a diagram illustrating the concept of setting a variable-length sequence number when the sequence number monotonously increases depending on transmission order according to an embodiment of the present invention.

FIG. 5 is a diagram for a description of a size of a sequence number when the sequence number monotonously increases depending on transmission order according to an embodiment of the present invention.

Referring to FIG. 5, at an initial transmission, even though only a part of a sequence number is used, there is a low possibility that confusion will occur due to the repeated use of the sequence number.

If a sequence number has a k-bit size and monotonously increases depending on transmission order, different packets are not mistaken for the same packet due to repeated use of the sequence number until $2^k$ packets are continuously lost.

For example, in a system using a 2-bit sequence number, a receiving side receives a packet 505 with a sequence number 2 at an arbitrary time. Assume that thereafter, a packet 510 with a sequence number 3, a packet 515 with a sequence number 0, a packet 520 with a sequence number 1, and a packet 525 with a sequence number 2 have been transmitted, the receiving side has failed to receive them due to an abrupt decrease in the channel condition. In this state, if a packet 530 with a sequence number 3 is received again at the receiving side, the receiving side may mistake the packet 530 with a sequence number 3 for the packet 510 with a sequence number 3, which was transmitted in a previous period.

However, in the general mobile communication system, there is a low probability that packets will be continuously lost. Particularly, in the LTE system, because HARQ is performed in the physical layer, there is almost no possibility that several tens of packets will be continuously lost. For this reason, therefore, it is possible to use a lower sequence number for initial transmission at which the sequence number monotonously increases according to the transmission order.

However, when the sequence number and the transmission order have no relationship with each other, the sequence number should be high enough to allow the receiving side to unambiguously distinguish the packets. For example, again, in the mobile communication system with a 2-bit sequence number, if the packet 530 with a sequence number 3 is transmitted, a transmitting part can no longer retransmit the packet 510 that was transmitted in a previous period and have the same sequence number. Therefore, when performing retransmission, there is a need for a long-length sequence number distinguishable from the same sequence number as the sequence number transmitted in the previous period.

Novel operations of a transmitting side and a receiving side, based on the fact that initial transmission and retransmission have different requirements for the size of the sequence number as described above, will now be described.

Figure 6:
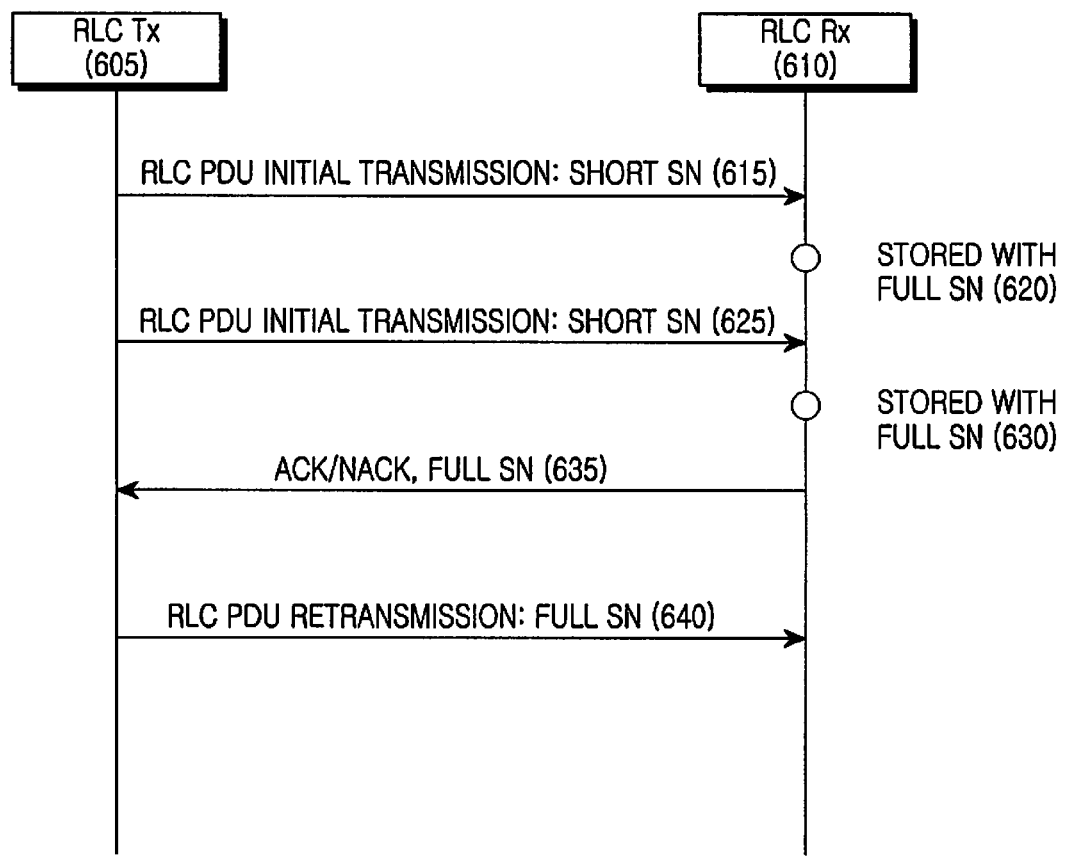
FIG. 6 is a signaling diagram of a mobile communication system that transmits a variable-length sequence number according to a first embodiment of the present invention.

FIG. 6 is a signaling diagram of a mobile communication system that transmits a variable-length sequence number depending on a retransmission/non-retransmission (i.e. the initial transmission) according to an embodiment of the present invention.

Referring to FIG. 6, to distinguish RLC PDUs, a full sequence number or a short sequence number is used for an RLC PDU of the present invention.

A transmitting side 605 uses a short sequence number corresponding to the last 'n' bits in the full sequence number, for the first transmitted packet in steps 615 and 625. Upon receipt of a packet with the short sequence number, a receiving side 610 restores the full sequence number from the short sequence number in steps 620 and 630.

If a predetermined condition is satisfied, the receiving side 610 reports the sequence numbers of the normally received packets and the missing packets to the transmitting side 605. The receiving side 610 reports in step 635 the packet reception status using the full sequence number restored in steps 620 and 630. In other words, the receiving side 610 sends an ACK/NACK signal in response to a success/failure of packet reception using the restored full sequence number.

In response to the ACK/NACK signal from the receiving side 610, the transmitting side 605 discards from its retransmission buffer the packets normally received at the receiving side 610, and performs a retransmission of the packets that failed to be normally received at the receiving side 610. In this case, the retransmission packets are transmitted using the full sequence number in step 640.

Because the present invention applies the different size sequence numbers to the initially transmitted packet and the retransmitted packet as described above, the receiving side should determine whether an arbitrary packet is an initially transmitted packet or a retransmitted packet, in order to comprehend the sequence number. In addition, the receiving side should determine whether a sequence number used for an arbitrary packet is a full sequence number or a short sequence number.

Figure 7A:
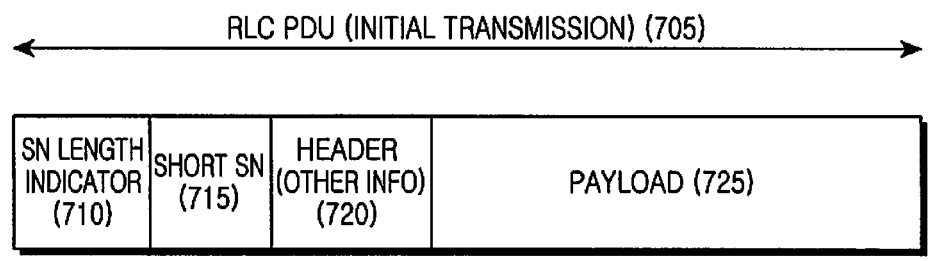
FIGS. 7A and 7B are diagrams illustrating RLC PDU formats according to the first embodiment of the present invention.
Figure 7B:
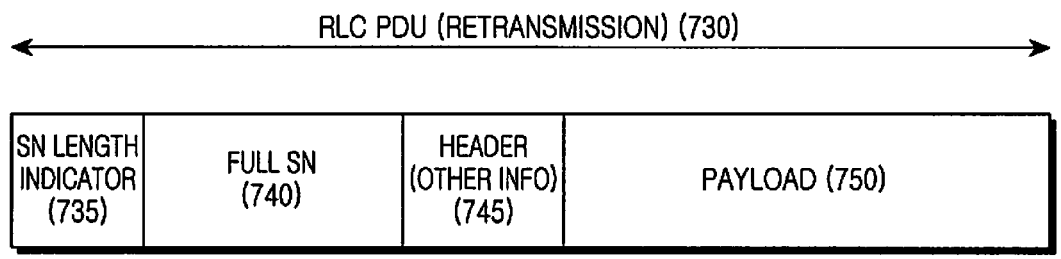

FIGS. 7A and 7B are diagrams illustrating examples of using different-length sequence numbers according to an embodiment of the present invention.

Referring to FIGS. 7A and 7B, the present invention inserts a 1-bit flag in a header of an RLC PDU to determine whether the sequence number is a short sequence number or a full sequence number.

RLC PDUs 705 and 730 each are composed of sequence number length indicators 710 and 735, sequence numbers 715 and 740, other headers 720 and 745, and payloads 725 and 750, respectively.

Referring to FIG. 7A, the sequence number length indicator 710 of the first transmitted RLC PDU 705 indicates a used status of a short sequence number, and a short sequence number is inserted in the sequence number field 715. The sequence number length indicator 710 can be set to '0' to indicate that the short sequence number is allocated to the sequence number field 715. The use of the flag can be predefined between the transmitting side and the receiving side.

Referring to FIG. 7B, the sequence number length indicator 735 of the retransmitted RLC PDU 730 indicates the used status of the full sequence number, and the full sequence number is inserted in the sequence number field 740. That is, the sequence number length indicator 735 can be set to '1' to indicate that the full sequence number is allocated to the sequence number field 740.

First Embodiment

Figure 8:
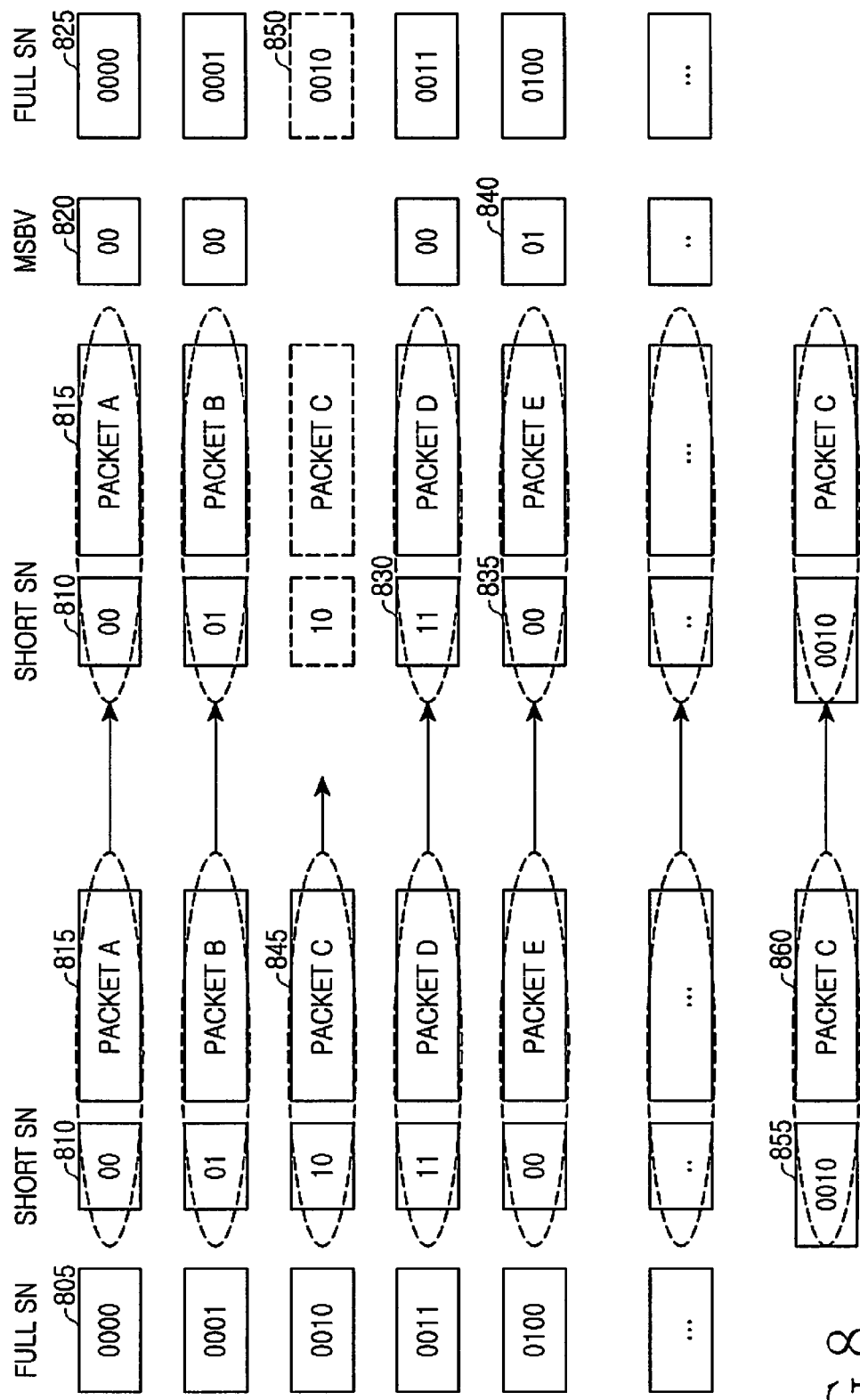
FIG. 8 is a conceptual diagram illustrating the relationship between a short sequence number and a full sequence number according to the first embodiment of the present invention.

FIG. 8 is a diagram illustrating the concept of restoring a full sequence number using a short sequence number according to a first embodiment of the present invention. An operation of the present invention will be described herein for the case where the full sequence number has 4 bits and the short sequence number has 2 bits.

Referring to FIG. 8, a transmitting side starts to sequentially allocate a full sequence number for its desired transmission packets beginning from '0000'. In other words, the transmitting side allocates '0000' as a full sequence number of the first transmitted RLC PDU in step 805.

Therefore, a short sequence number '00' 810 is inserted in a sequence umber field of a header of the first transmitted RLC PDU. For convenience, the remaining part except for the sequence number field in the packet is called a packet A 815.

The short sequence number and the packet A and transmitted to a receiving side, and the receiving side restores a full sequence number using the received short sequence number as follows.

Full Sequence Number=(*MSBV* of Full Sequence Number)+(Short Sequence Number)

Herein, the Most Significant Bits Value (MSBV) of a fill sequence number means the remaining bits obtained by removing the bits corresponding to the short sequence number in the full sequence number. Therefore, when the full sequence number has 4 bits and the short sequence number has the last 2 bits of the full sequence number, MSBV indicates the 2 most significant bits of the full sequence number. Actually, however, because the MSBV is not transmitted, the receiving side restores the MSBV as follows.

The receiving side initializes MSBV to '00', and increases the MSBV by 1 each time a period of a short sequence number of the received packet is changed. The change in the period of the short sequence number means that the short sequence number returns back to '0' after using its highest value.

In the example of FIG. 8, it is considered that if the short sequence number returns back to a binary '00' 835 after using a binary '11' 830, the period of the short sequence number is changed. If the period of the short sequence number is changed, the currently received short sequence number is less than the immediately previously received short sequence number.

Therefore, if the short sequence number 835 of the currently received packet is less than the short sequence number 830 of the immediately previously received packet, the receiving side increases MSBV by 1 in step 840, considering that the period of the short sequence number is changed.

For reference, in the system supporting HARQ, there may be a difference between an order in which a packet is transmitted and an order in which the packet is successfully received, due to a deviation between HARQ transmission delays. For example, the HARQ receiving side may receive a packet B with a higher sequence number in advance of a packet A with a lower sequence number. This is called a disordering phenomenon. Commonly, therefore, an immediately upper layer of the HARQ receiving side reorders the received packets, taking the disordering phenomenon into account.

In the present invention, when a short sequence number of the currently received packet is less than a short sequence number of the immediately previously received packet, the MSBV increases by 1, and the reception order means the order after reordering is applied.

If the receiving side has failed to normally receive a packet C 845 for some reason, the receiving side requests retransmission of the packet C 845 using a full sequence number '0010' 850 of the packet C 845, and the transmitting side attaches a full sequence number 855 to the packet C 860 and then retransmits it.

Figure 9:
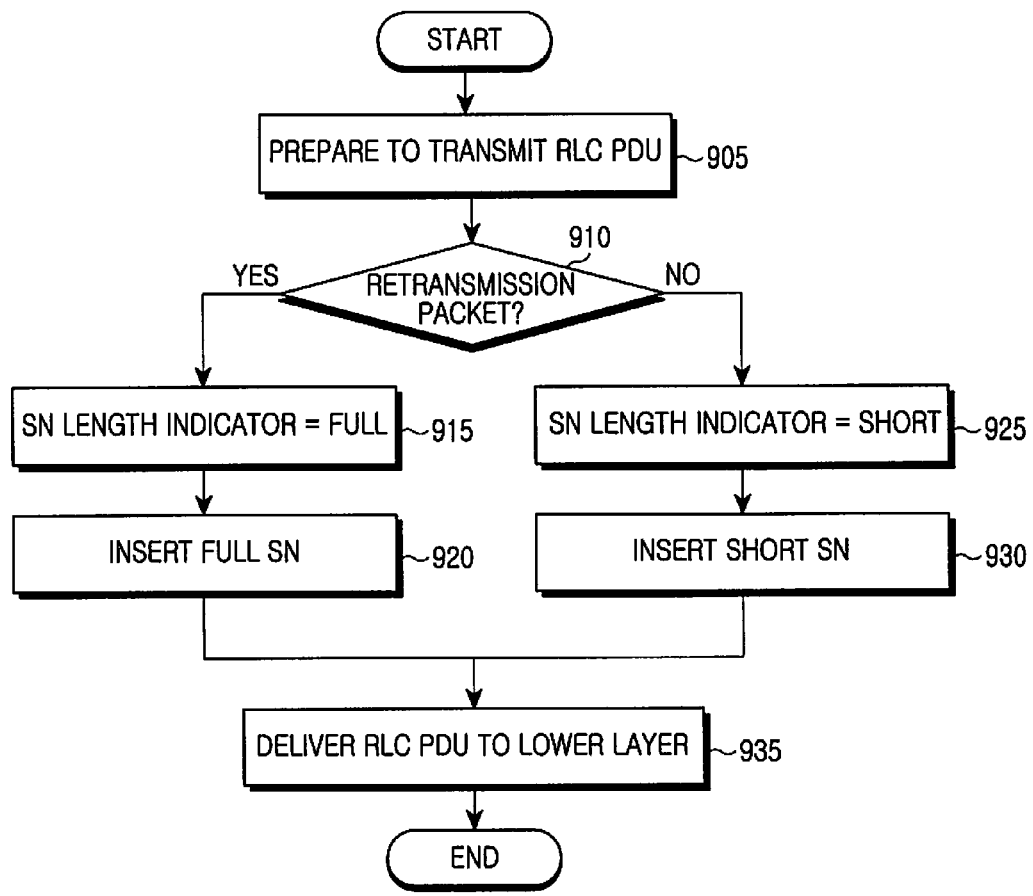
FIG. 9 is a diagram illustrating a transmission operation according to the first embodiment of the present invention.

FIG. 9 is a diagram illustrating a transmission operation according to the first embodiment of the present invention.

Referring to FIG. 9, in step 905, an RLC transmitting side prepares for transmission of an arbitrary RLC PDU.

In step 910, the RLC transmitting side determines whether the transmission RLC PDU is a retransmission RLC PDU or an initial transmission RLC PDU. If the transmission RLC PDU is a retransmission RLC PDU, the RLC transmitting side proceeds to step 915, and if the transmission RLC PDU is an initial transmission RLC PDU, the RLC transmitting side proceeds to step 925.

In step 915, the RLC transmitting side sets a sequence number length indicator of an RLC PDU header to a value indicating a full sequence number, and then proceeds to step 920 where the RLC transmitting side inserts a full sequence number in the RLC PDU. When the transmission RLC PDU is a retransmission RLC PDU, because a header already exists, the operation of steps 915 and 920 can be an operation of changing the already existing header to a new value. After setting the header of the RLC PDU to an appropriate value, the RLC transmitting side delivers the RLC PDU with a full sequence number inserted therein to a lower layer in step 935.

However, in step 925, the RLC transmitting side sets the sequence number length indicator to a value indicating a short sequence number, and then proceeds to step 930 where the RLC transmitting side inserts a short sequence number in the RLC PDU. In other words, the RLC transmitting side detaches a predetermined number of last bits from the full sequence number of the RLC PDU to generate a short sequence number, and inserts the short sequence number into the sequence number field of the RLC PDU. The number of the last bits of the full sequence number, to be used for the short sequence number, is predetermined.

After allocating the short sequence number for the RLC PDU, the RLC transmitting side delivers the RLC PDU with the short sequence number inserted therein to the lower layer in step 935.

Figure 10:
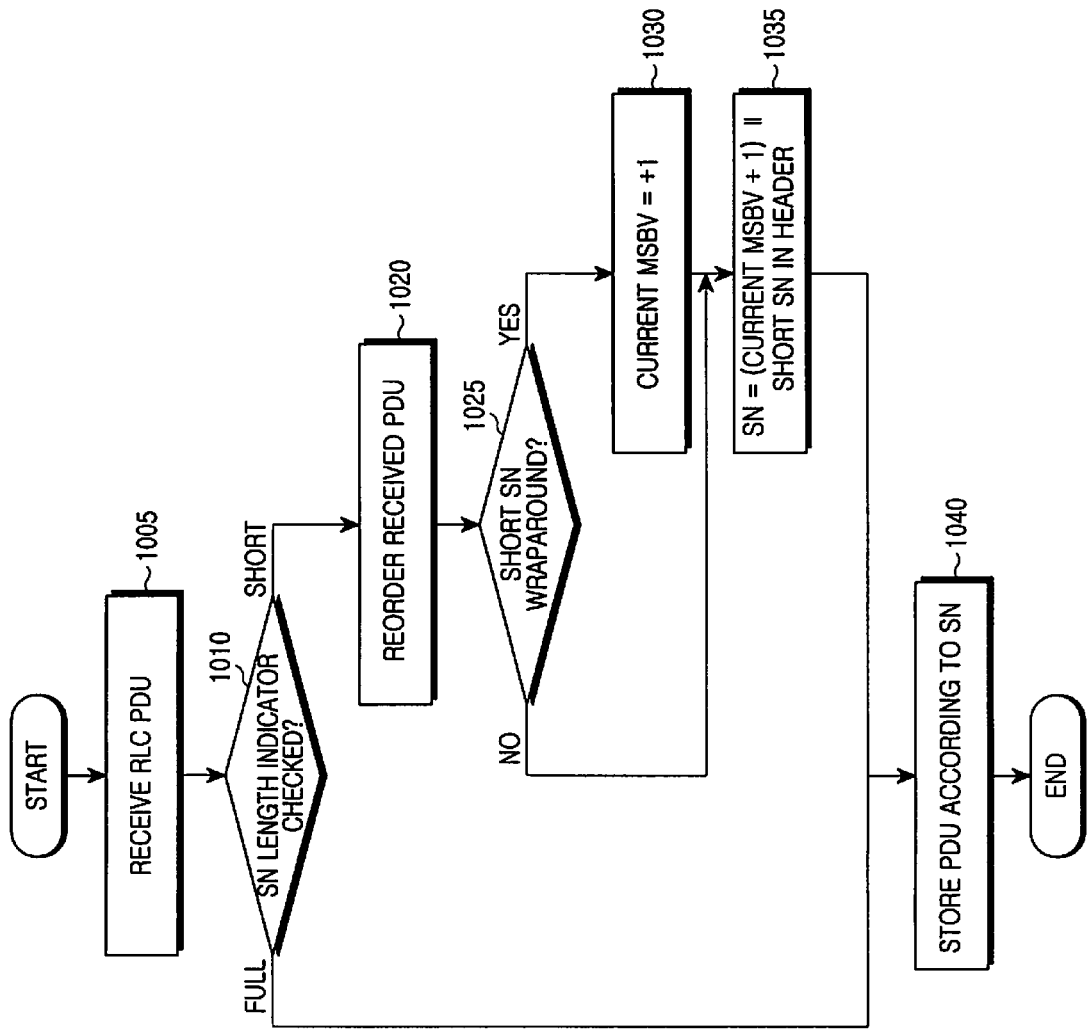
FIG. 10 is a diagram illustrating a reception operation according to the first embodiment of the present invention.

FIG. 10 is a diagram illustrating an operation of an RLC receiving side according to the first embodiment of the present invention.

Referring to FIG. 10, upon receipt of an RLC PDU in step 1005, the RLC receiving side checks a sequence number length indicator of the received RLC PDU in step 1010.

If the sequence number length indicator is set to a value indicating a full sequence number, the RLC receiving side proceeds to step 1040 where it performs a necessary operation of storing the received RLC PDU in a reception buffer according to a sequence number of the RLC PDU, and assembling it in an upper layer packet.

However, if the sequence number length indicator is set to a value indicating a short sequence number, the RLC receiving side proceeds to step 1020.

In step 1020, the RLC receiving side performs a reordering process on the received RLC PDU, and proceeds to step 1025 after reordering the RLC PDU. As described above, in the communication system supporting HARQ, there may be a difference between an order in which a packet is transmitted and an order in which the packet is successfully received, and the reordering process is a process of correcting the disordering phenomenon occurring due to HARQ.

For example, in the case where a packet with a sequence number 1 (binary '01') is transmitted in advance of a packet with a sequence number 2 (binary '10'), if a HARQ packet containing the packet with a sequence number 2 (binary '10') has been successfully received at the receiving side with 2 retransmissions and a HARQ packet containing the packet with a sequence number 1 (binary '01') has been successfully received at the receiving side with 4 retransmissions, the receiving side will receive the packet with a sequence number 2 (binary '10') in advance of the packet with a sequence number 1 (binary '01'). The simplest way to correct this disordering phenomenon is given as follows. That is, at the time an arbitrary packet is received, if a packet with a sequence number lower than that of the received packet has not been received yet, the receiving side considers that the received packet has not been reordered yet, for a predetermined time. After a lapse of the predetermined time, if a packet with a sequence number lower than that of the arbitrary packet is received, the receiving entity can perform reordering. There are various other reordering schemes, and a detailed description thereof will be omitted herein because the reordering scheme is not an essential element for implementing the present invention.

After reordering the received packet, the RLC receiving side determines in step 1025 whether the short sequence number has undergone a wraparound. The 'short sequence number wraparound' as used herein refers to a phenomenon in which after the highest sequence number is used, the sequence number resets to '0' resumes its progression.

For example, when the currently received sequence number is lower than the immediately previously received sequence number, it is possible to consider that a wraparound has occurred. If the short sequence number has undergone wraparound, the RLC receiving side proceeds to step 1030 where it increases MSBV by 1. In step 1035, the RLC receiving side restores a full sequence number by concatenating MSBV to the received short sequence number.

However, if the short sequence number has not undergone a wraparound, the RLC receiving side directly jumps to 1035 where it restores a full sequence number by concatenating MSBV to the received short sequence number.

The MSBV is a variable in which a Most Significant Bit (MSB) value of the full sequence number is stored, and the RLC receiving side first initializes MSBV to '0' and then increases MSBV by 1 every time the short sequence number wraparound happens.

After restoring the full sequence number from the MSBV and the short sequence number, the RLC receiving side stores in step 1040 the RLC PDU in a reception buffer according to the full sequence number and performs other necessary operations.

Second Embodiment

A second embodiment of the present invention provides a method in which a transmitting side transmits a full sequence number even for an initial transmission RLC PDU upon detecting a situation that more than a predetermined number of RLC PDUs are lost, which can be indicated with a short sequence number.

Figure 11:
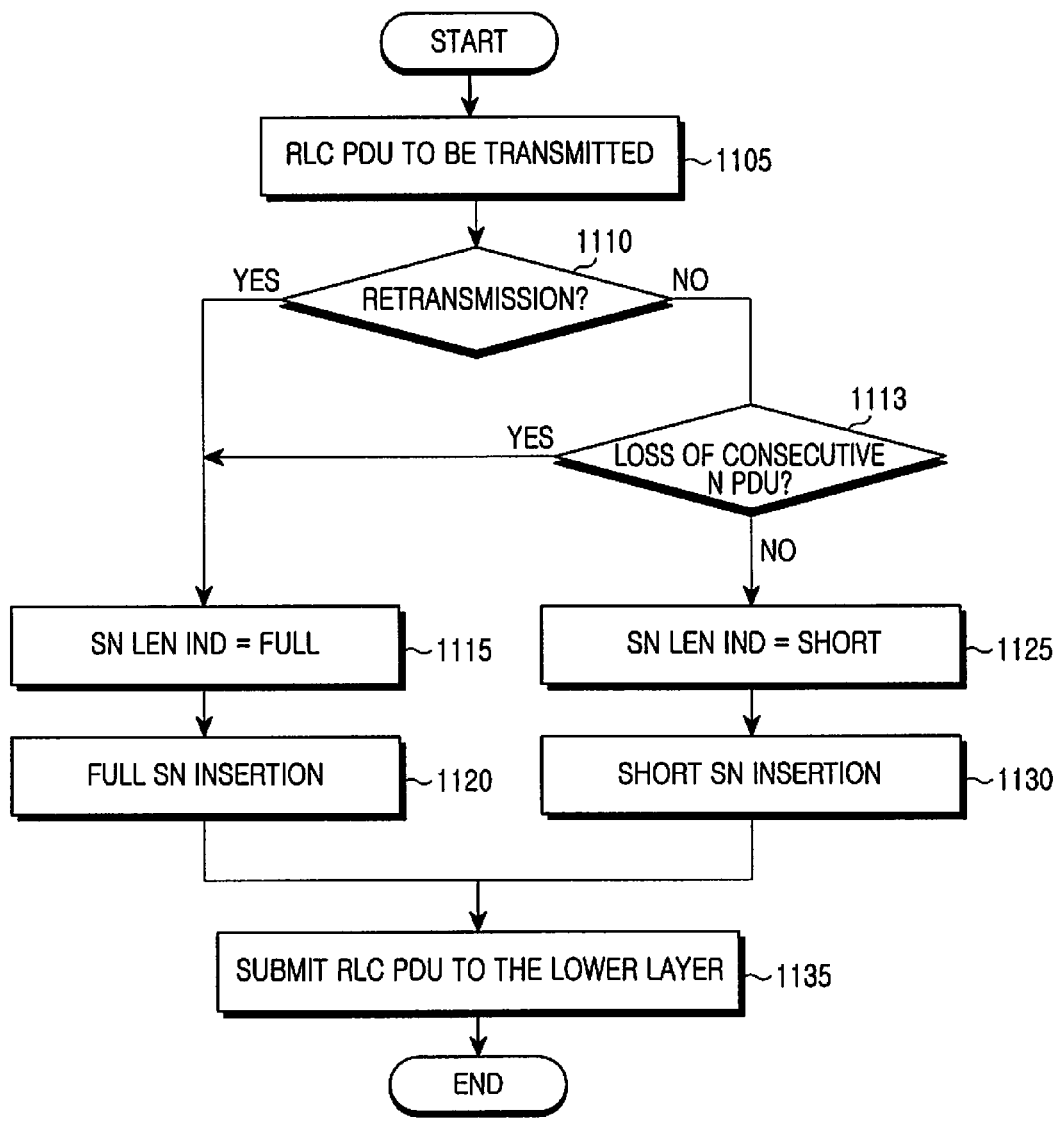
FIG. 11 is a diagram illustrating a transmission operation according to a second embodiment of the present invention.

FIG. 11 is a diagram illustrating an operation of an RLC transmitting side according to a second embodiment of the present invention.

Referring to FIG. 11, the RLC transmitting side prepares for transmission of an arbitrary RLC PDU in step 1105.

In step 1110, the RLC transmitting side determines whether the transmission RLC PDU is a retransmission RLC PDU. If the transmission RLC PDU is a retransmission RLC PDU, the RLC transmitting side proceeds to step 1115, and if the transmission RLC PDU is an initial transmission RLC PDU, the RLC transmitting side proceeds to step 1113.

In step 1113, the RLC transmitting side determines whether there is a possible loss of 'n' consecutive previous RLC PDUs, where 'n' denotes the maximum number of RLC PDUs that can be protected with a short sequence number. If the number of short sequence number is k, $n=2^k$.

The RLC transmitting side can determine satisfaction/dissatisfaction of the condition using an HARQ transmission status of the RLC PDUs. In an LTE, a HARQ transmission apparatus reports a transmission success/failure (or a HARQ ACK/NACK) of an RLC PDU to an RLC transmitting side. Upon receipt of a HARQ ACK for a packet containing an arbitrary RLC PDU from a HARQ reception apparatus, the HARQ transmission apparatus reports a transmission success of the RLC PDU to the RLC transmitting side. However, because the HARQ transmission apparatus may misconceive a transmission success/failure for an arbitrary RLC PDU due to an error that a HARQ NACK is mistaken for a HARQ ACK, it is preferable for the RLC transmitting side to somewhat conservatively determine the report of the HARQ transmission apparatus rather than to fully rely on it. For example, upon receipt of a transmission failure report for 'm' RLC PDUs among the 'n' consecutive previous RLC PDUs, the RLC transmitting side proceeds to step 1115, determining that there is a possibility that a transmission of 'n' consecutive RLC PDUs was failed.

In step 1115, the RLC transmitting side sets a sequence number length indicator of an RLC PDU header to a value indicating a full sequence number, and then proceeds to step 1120 where it inserts a full sequence number in the RLC PDU. When the transmission RLC PDU is a retransmission RLC PDU, because a header already exists, the operation of steps 1115 and 1120 can be an operation of changing the already existing header to a new value. After setting the header of the RLC PDU to an appropriate value, the RLC transmitting side delivers the RLC PDU with a full sequence number inserted therein to a lower layer in step 1135.

If it is determined in step 1113 that there is no possible loss of 'n' consecutive previous RLC PDUs, the RLC transmitting side proceeds to step 1125.

In step 1125, the RLC transmitting side sets the sequence number length indicator to a value indicating a short sequence number, and then proceeds to step 1130 where the RLC transmitting side inserts a short sequence number in the RLC PDU. In other words, the RLC transmitting side detaches a predetermined number of last bits from the full sequence number of the RLC PDU to generate a short sequence number, and inserts the short sequence number into the sequence number field of the RLC PDU. The number of the last bits of the full sequence number, to be used for the short sequence number, is predetermined.

After allocating the short sequence number for the RLC PDU, the RLC transmitting side delivers the RLC PDU with the short sequence number inserted therein to the lower layer in step 1135.

Figure 12:
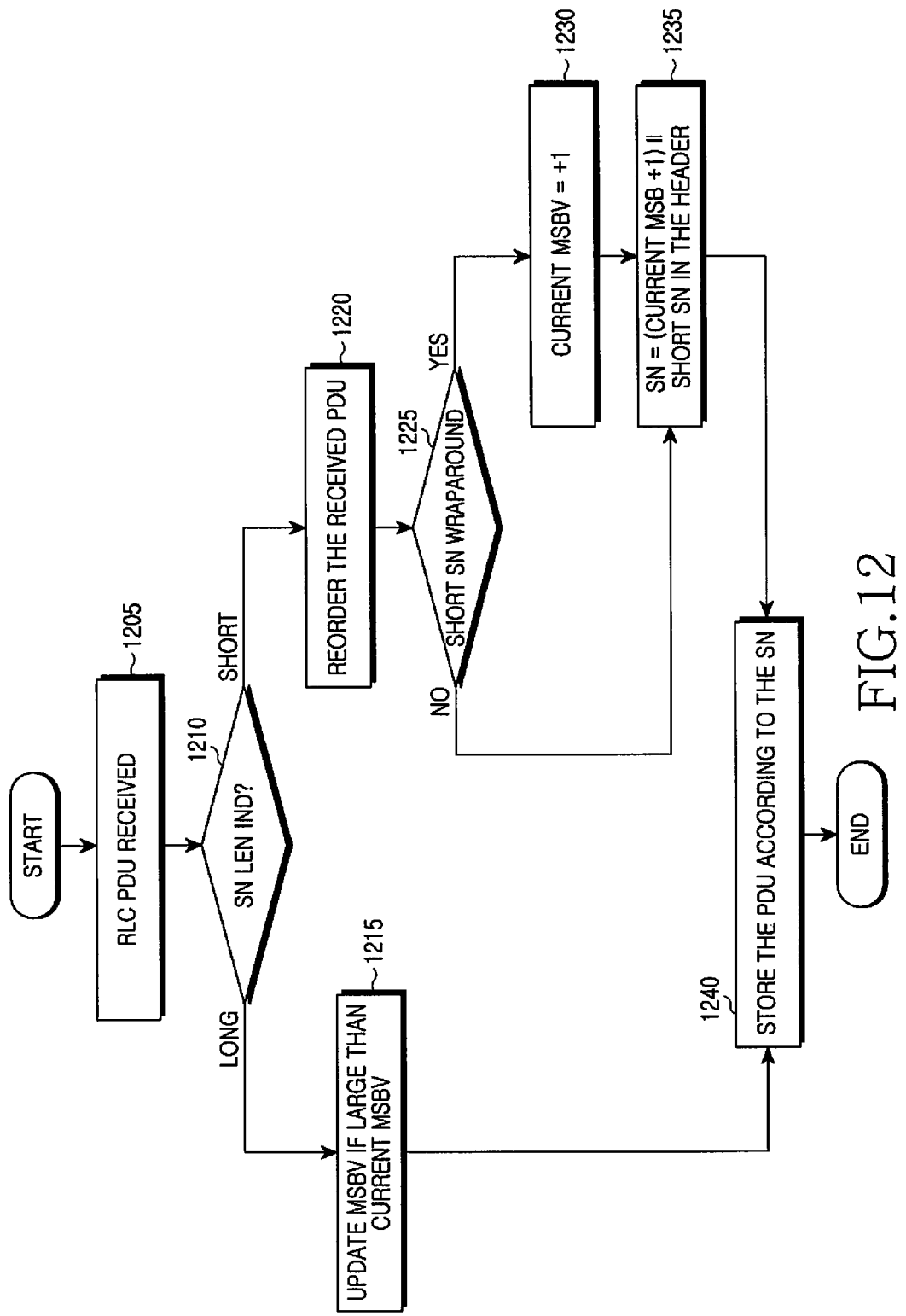
FIG. 12 is a diagram illustrating a reception operation according to the second embodiment of the present invention.

FIG. 12 is a diagram illustrating an operation of an RLC receiving side according to the second embodiment of the present invention.

Referring to FIG. 12, upon receipt of an RLC PDU in step 1205, an RLC receiving side checks a sequence number length indicator of the received RLC PDU in step 1210.

If the sequence number length indicator is set to a value indicating a full sequence number, the RLC receiving side proceeds to step 1215, and if the sequence number length indicator is set to a value indicating a short sequence number, the RLC receiving side proceeds to step 1220.

In step 1215, the RLC receiving side compares the highest sequence number among the full sequence numbers received or restored up to now with the received full sequence number, and updates the highest sequence number. The highest sequence number is stored in an arbitrary variable, and the arbitrary variable is updated each time a much higher sequence number is received or restored. For convenience, in the following description, the highest sequence number will be referred to as Highest Variable Received (VR(H)).

If the received full sequence number is higher than VR(H), it means that although the RLC PDU contains a fill sequence number, it is an initial transmission RLC PDU. In this case, the RLC receiving side updates VR(H) with the received full sequence number. In addition, the RLC receiving side updates its recognized MSBV with a part corresponding to MSBV of the received full sequence number. For convenience, a value corresponding to a MSBV in a sequence number of an RLC PDU containing a full sequence number will be called a MSBV_received, and a MSBV recognized by the RLC receiving side will be called MSBV_current.

If MSBV_received is greater than MSBV_current, the RLC receiving side updates MSBV_current with MSBV_received. In addition, the RLC receiving side memorizes a part corresponding to the short sequence number of the full sequence number. Thereafter, when receiving an RLC PDU containing a short sequence number and determining a wrap-around phenomenon of the short sequence number, the RLC receiving side uses the memorized part corresponding to the short sequence number of the full sequence number.

For example, if MSBV_current of the RLC receiving side is '0011 1100 0011' and the full sequence number of the received RLC PDU is '0011 1100 0100 0011 1110', the RLC receiving side updates MSBV_current with '0011 1100 0100' which is a value corresponding to MSBV in the received sequence number. In addition, the RLC receiving side memorizes '0011 1110' which is a part corresponding to a short sequence number in the received full sequence number, and uses it later when determining occurrence of a wrap-around phenomenon of the short sequence number.

This phenomenon in which MSBV_received is greater than MSBV_current can happen when the RLC receiving side uses a full sequence number for an initial transmission RLC PDU upon detecting a loss of consecutive RLC PDUs.

After completion of the above operation, the RLC receiving side proceeds to step 1240.

If the received full sequence number is equal to or less than VR(H), it means that the corresponding RLC PDU is a retransmission RLC PDU, and the RLC receiving side directly proceeds to step 1240 without updating VR(H) with the received full sequence number.

In step 1240, the RLC receiving side stores the RLC PDU in a reception buffer according to the sequence number of the received RLC PDU, and performs a necessary operation of, for example, assembling an upper layer packet.

In step 1220, the RLC receiving side performs a reordering process on the received RLC PDU, and proceeds to step 1225 after reordering the RLC PDU. In the communication system supporting HARQ, there may be a difference between an order in which a packet is transmitted and an order in which the packet is successfully received, so the RLC receiving side performs the reordering process to correct the disordering phenomenon occurring due to HARQ.

For example, in the case where a transmitting side has transmitted a packet with a sequence number 1 '01' in advance of a packet with a sequence number 2 '10', if a HARQ packet containing the packet with a sequence number 2 '10' has been successfully received at a receiving side with 2 retransmissions and a HARQ packet containing the packet with a sequence number 1 '01' has been successfully received at the receiving side with 4 retransmissions, the receiving side will receive the packet with a sequence number 2 '10' in advance of the packet with a sequence number 1 '01'. As described above, the simplest way to correct this disordering phenomenon is given as follows. That is, at the time an arbitrary packet is received, if a packet with a sequence number lower than that of the received packet has not yet been received, the receiving side considers that the received packet has not been reordered yet, for a predetermined time. After a lapse of the predetermined time, if a packet with a sequence number lower than that of the arbitrary packet is received, the receiving side can perform reordering.

After reordering the received packet in step 1220, the RLC receiving side determines in step 1225 whether the short sequence number has undergone wraparound. The phase 'short sequence number wraparound' as used herein refers to a phenomenon in which after the highest sequence number is used, the sequence number starts again from '0'. For example, if a sequence number of the currently received packet is lower than a sequence number of an immediately previously received packet, it can be considered that the sequence number wraparound has happened.

If the short sequence number has undergone wraparound, the RLC receiving side increases the MSBV by 1 in step 1230, and then proceeds to step 1235 where it restores a full sequence number by concatenating the MSBV to the received short sequence number. However, if the short sequence number has not undergone wraparound, the RLC receiving side directly jumps to step 1235 where it restores a full sequence number by concatenating the MSBV to the received short sequence number.

The MSBV is a variable in which an MSB value of the full sequence number is stored, and the RLC receiving side first initializes MSBV to '0' and then increases MSBV by 1 every time the short sequence number wraparound happens.

After restoring the full sequence number from the MSBV and the short sequence number, the RLC receiving side stores in step 1240 the RLC PDU in a reception buffer according to the full sequence number and performs other necessary operations.

Figure 13:
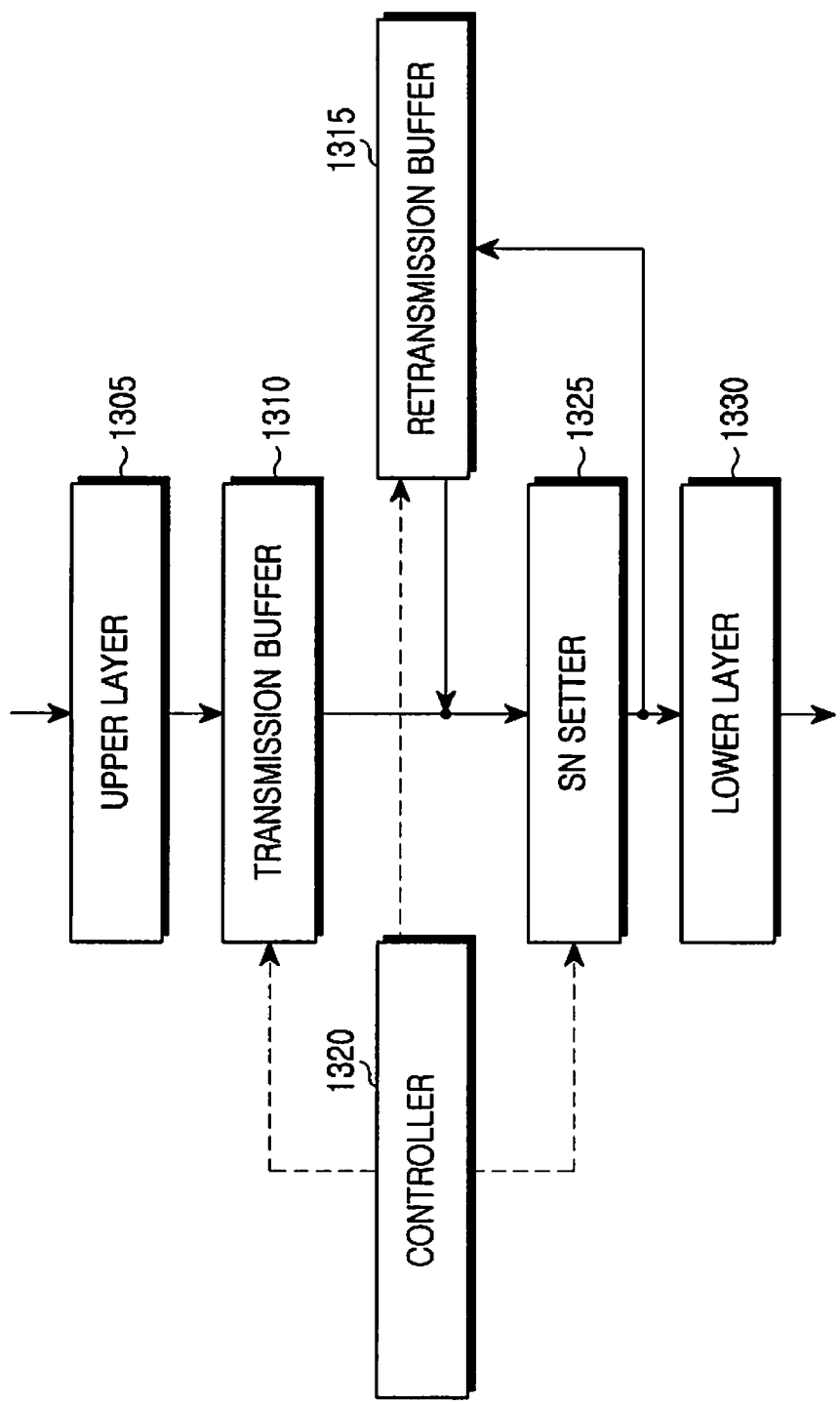
FIG. 13 is a diagram illustrating a structure of a transmission apparatus according to an embodiment of the present invention.

FIG. 13 is a diagram illustrating a structure of a transmission apparatus according to an embodiment of the present invention.

Referring to FIG. 13, the transmission apparatus includes an upper layer 1305, a transmission buffer 1310, a controller 1320, a retransmission buffer 1315, a sequence number setter 1325 and a lower layer 1330.

The upper layer 1305 can be, for example, a PDCP entity, and one upper layer 1305 is configured per service. The upper layer 1305 appropriately processes a packet generated in the service and then delivers it to the transmission buffer 1310.

The transmission buffer 1310 stores an upper layer packet until it is transmitted. The transmission buffer 1310, under the control of the controller 1320, divides the stored upper layer packet in an appropriate size, and delivers the resulting packets to the sequence number setter 1325.

The sequence number setter 1325 attaches a sequence number with an appropriate size to the packet under the control of the controller 1320. According to the first embodiment of the present invention, if the corresponding packet is an initial transmission packet, the sequence number setter 1325 inserts a short sequence number, and if the corresponding packet is a retransmission packet, the sequence number setter 1325 inserts a full sequence number. According to the second embodiment of the present invention, even though the corresponding packet is an initial transmission packet, the sequence number setter 1325 inserts a full sequence number if there is a possible loss of n consecutive RLC PDUs. The RLC PDU output from the sequence number setter 1325 is delivered to the lower layer 1330 and the retransmission buffer 1315.

The retransmission buffer 1315 stores the RLC PDU until it receives an ACK, and retransmits the RLC PDU upon receipt of a NACK.

The lower layer 1330 transmits the RLC PDU provided from the sequence number setter 1325 over a wireless channel.

Upon receipt of transmission resources allocated from a Node B scheduler, the controller 1320 determines a transmission RLC PDU. Because retransmission is generally higher in priority than initial transmission, if a retransmission RLC PDU is stored in the retransmission buffer 1315, the controller 1320 sends a retransmission command to the retransmission buffer 1315. In addition, the controller 1320 sends to the sequence number setter 1325 a notification indicating a full sequence number of the retransmission RLC PDU. Therefore, the sequence number setter 1325 substitutes a short sequence number in a header of the retransmission RLC PDU with a full sequence number, and then delivers the RLC PDU to the lower layer 1330.

If an RLC PDU to be transmitted in the next transmission period is an initial transmission RLC PDU, the controller 1320 controls the transmission buffer 1310 to divide the upper layer packet stored in the transmission buffer 1310 in an appropriate size, and to deliver the resulting packets to the sequence number setter 1325. In addition, the controller 1320 notifies the sequence number setter 1325 of the short sequence number to be used. The sequence number setter 1325 inserts the short sequence number notified by the controller 1320 into the RLC PDU, and then delivers it to the lower layer 1330.

Figure 14:
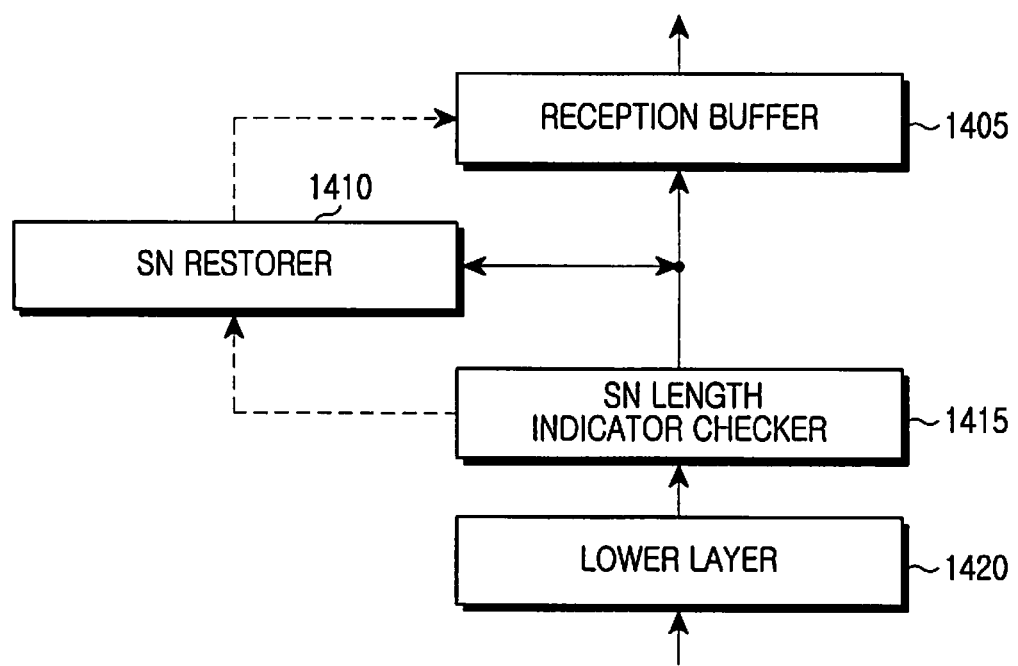
FIG. 14 is a diagram illustrating a structure of a reception apparatus according to an embodiment of the present invention.

FIG. 14 is a diagram illustrating a structure of a reception apparatus according to an embodiment of the present invention.

Referring to FIG. 14, the reception apparatus includes a lower layer 1420, a sequence number length indicator checker 1415, a sequence number restorer 1410 and a reception buffer 1405.

The lower layer 1420 delivers an RLC PDU received over a wireless channel to the sequence number length indicator checker 1415.

The sequence number length indicator checker 1415 checks a sequence number length indicator of the RLC PDU, and determines whether a sequence number inserted in the RLC PDU is a short sequence number or a full sequence number. Upon receipt of an RLC PDU with a short sequence number inserted therein, the sequence number length indicator checker 1415 delivers the sequence number of the RLC PDU to the sequence number restorer 1410, and delivers the RLC PDU to the reception buffer 1405. Upon receipt of an RLC PDU with a full sequence number inserted therein, the sequence number length indicator checker 1415 delivers the received RLC PDU to the reception buffer 1405.

The reception buffer 1405 performs reordering on the received RLC PDUs, and notifies the sequence number restorer 1410 of short sequence numbers of the reordered RLC PDUs. The sequence number restorer 1410 restores a full sequence number from the short sequence number of the reordered RLC PDU, and delivers the restored full sequence number to the reception buffer 1405.

The reception buffer 1405 replaces the short sequence number of the RLC PDU with the full sequence number provided from the sequence number restorer 1410, appropriately processes the fully reordered RLC PDUs, and delivers them to the upper layer.

As is apparent from the foregoing description, the present invention reduces a size of the sequence number of the initial transmission packet, thereby contributing to a reduction in the amount of transmission resources used for packet transmission. In addition, the present invention uses packet transmission resources for sequence number transmission as resources for other services, thereby meeting the QoS requirements.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a packet by a transmission apparatus in a mobile communication system, the method comprising:

allocating a short sequence number for an initial transmission using some bits from among bits of a full sequence number for expressing a sequence number of the packet, and setting a first flag indicating use of the short sequence number;

inserting the short sequence number and the first flag into the packet, and transmitting the packet with the short sequence number and the first flag inserted therein to a receiving side;

before the allocation of the short sequence number, determining whether there is a loss of 'n' previously-transmitted consecutive packets where 'n' denotes an integer;

if there is the loss of the 'n' previously-transmitted packets, allocating the full sequence number for expressing the sequence number of the packet, and setting a second flag indicating use of the full sequence number; and inserting the full sequence number and the second flag into the packet, and transmitting the packet with the full sequence number and the second flag inserted therein to the receiving side.

2. The method of claim 1, wherein the some bits are last n bits of the full sequence number.

3. The method of claim 1, further comprising:

allocating the full sequence number for a retransmission for expressing the sequence number of the packet, and setting a the second flag indicating use of the full sequence number; and inserting the full sequence number and the second flag into the packet, and transmitting the packet with the full sequence number and the second flag inserted therein to the receiving side.

4. A method for receiving a packet by a receiving side in a mobile communication system, the method comprising:

receiving a packet transmitted from a transmitting side;

detecting a flag information indicating whether an allocated sequence number for the received packet is a short sequence number or a full sequence number, and replacing the short sequence number with the full sequence number including bits of the short sequence number if the flag information indicates the allocated sequence number for the received packet is the short sequence number;

reordering received packets according to the full sequence number, and delivering the reordered packets to an upper layer;

if the flag information comprises an indicator indicating that for a retransmission, the transmitting side uses the full sequence number for expressing the allocated sequence number of the received packet, reordering the received packets according to the full sequence number and delivering the reordered packets to the upper layer;

comparing the full sequence number with a highest sequence number among full sequence numbers received or restored up to a present time; and updating some higher order bits of the highest sequence number according to the comparison result, and storing some lower order bits except for the some higher order bits in the full sequence number.

5. The method of claim 4, wherein the flag information comprises an indicator indicating that for an initial transmission, the transmitting side has allocated the short sequence number using some lower order bits of the full sequence number for expressing the allocated sequence number of the received packet.

6. The method of claim 4, wherein the received packets are reordered using the stored some lower order bits.

7. A packet transmission apparatus for allocating a sequence number to a packet and transmitting the packet in a mobile communication system, the apparatus comprising:

a controller for controlling a retransmission buffer and a transmission buffer to separately output a packet for retransmission and a packet for initial transmission; and a sequence number setter for, under a control of the controller, allocating a short sequence number for an initial transmission using some bits from among bits of a full sequence number for expressing a sequence number of the packet, and setting a first flag indicating use of the short sequence number, inserting the short sequence number and the first flag into the packet, and transmitting the packet with the short sequence number and the first flag inserted therein to a receiving side, before the allocation of the short sequence number, determining whether there is a loss of 'n' previously-transmitted consecutive packets where 'n' denotes an integer, if there is the loss of the 'n' previously-transmitted packets, allocating the full sequence number for expressing the sequence number of the packet, and setting a second flag indicating use of the full sequence number, and inserting the full sequence number and the second flag into the packet, and transmitting the packet with the full sequence number and the second flag inserted therein to the receiving side.

8. The packet transmission apparatus of claim 7, wherein the sequence number setter further allocates the full sequence number for a retransmission for expressing the sequence number of the packet, and setting the second flag indicating use of the full sequence number, and inserting the full sequence number and the second flag into the packet, and transmitting the packet with the full sequence number and the second flag inserted therein to the receiving side.

9. The packet transmission apparatus of claim 7, wherein the some lower order bits are last n bits of full sequence number.

10. A packet reception apparatus for receiving a packet in a mobile communication system, the apparatus comprising:

a sequence number length indicator checker for checking a header of a received packet, and determining whether a sequence number allocated to the received packet is a short sequence number or a full sequence number;

a sequence number restorer for, if the sequence number is the short sequence number, replacing the short sequence number with the full sequence number including bits of the short sequence number; and a reception buffer for reordering received packets according to the full sequence number, and delivering the reordered packets to an upper layer, wherein for the short sequence number, the sequence number restorer restores the full sequence number by sequentially monotonously increasing upper bits except for some lower order bits in the full sequence number.

11. The packet reception apparatus of claim 10, wherein the sequence number length indicator checker checks a sequence number allocated to the received packet using an indicator indicating that for an initial transmission, a transmitting side has allocated the short sequence number using the some lower order bits of a minimum length for distinguishing the received packets among bits for expressing a sequence number of the received packet.

12. The packet reception apparatus of claim 10, wherein the sequence number length indicator checker compares the full sequence number with a highest sequence number among the full sequence numbers received or restored up to now, and updates some higher order bits of the highest sequence number according to the comparison result, and storing some lower order bits except for the some higher order bits.

13. The packet reception apparatus of claim 12, wherein the reception buffer reorders the received packets using the stored some lower order bits.

* * * * *